(12) United States Patent
Suzuki (10) Patent No.: US 8,027,239 B2
(45) Date of Patent: Sep. 27, 2011

(54) DATA RECORDING AND REPRODUCING DEVICE, CAMERA DEVICE, AND DATA RECORDING AND REPRODUCING METHOD

(75) Inventor: Yuichi Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 424 days.

(21) Appl. No.: 12/237,672

(22) Filed: Sep. 25, 2008

(65) Prior Publication Data

US 2009/0092027 A1    Apr. 9, 2009

(30) Foreign Application Priority Data

Oct. 4, 2007    (JP) ................................ 2007-261258

(51) Int. Cl.
*G11B 7/00*    (2006.01)
(52) U.S. Cl. ........................................ 369/106; 369/100
(58) Field of Classification Search ........................ None
See application file for complete search history.

(56) References Cited

U.S. PATENT DOCUMENTS

| | | | |
|---|---|---|---|
| 5,491,676 A * | 2/1996 | Yamaguchi et al. | 369/44.28 |
| RE40,946 E * | 10/2009 | Watanabe et al. | 369/44.27 |
| 7,693,027 B2 * | 4/2010 | Kim et al. | 369/116 |
| 2005/0259260 A1 * | 11/2005 | Wakita | 356/436 |
| 2005/0281156 A1 * | 12/2005 | Watanabe | 369/47.11 |
| 2007/0053277 A1 * | 3/2007 | Kim et al. | 369/116 |

FOREIGN PATENT DOCUMENTS

| | | |
|---|---|---|
| JP | 60-237648 A | 11/1985 |
| JP | 63-146236 A | 6/1988 |
| JP | 11-167721 A | 6/1999 |
| JP | 2001-067673 A | 3/2001 |
| JP | 2003-173531 A | 6/2003 |
| JP | 2003-257072 A | 9/2003 |

* cited by examiner

*Primary Examiner* — Joseph Feild
*Assistant Examiner* — Huy Nguyen
(74) *Attorney, Agent, or Firm* — Wolf, Greenfield & Sacks, P.C.

(57) ABSTRACT

A data recording and reproducing device includes: a light emitting element that generates light and emits the light toward an optical recording medium; a light emission control section that feedback-controls an emitted light quantity from the light emitting element; a light attenuating drive section that includes a light attenuating section, and inserts the light attenuating section into an emission path of the light when reproducing data from the optical recording medium and retracts the light attenuating section from the emission path when recording data onto the optical recording medium; and a shock detecting section that detects a shock of a magnitude causing the light attenuating drive section to switch between the insertion and retraction. When the shock detecting section detects the shock during data recording, the light emission control section lowers a control target value of the emitted light quantity from a value set at the time of shock detection.

7 Claims, 4 Drawing Sheets

DATA RECORDING AND REPRODUCING DEVICE, CAMERA DEVICE, AND DATA RECORDING AND REPRODUCING METHOD

CROSS REFERENCES TO RELATED APPLICATIONS

The present invention contains subject matter related to Japanese Patent Application JP 2007-261258 filed in the Japanese Patent Office on Oct. 4, 2007, the entire contents of which are incorporated herein by reference.

BACKGROUND OF THE INVENTION

1. Field of the Invention

The present invention relates to a data recording and reproducing device, a data recording and reproducing method, and a camera device, in which whether or not to attenuate light from a light emitting element within its emission path is switched between when reproducing data and when recording data, or in accordance with the kind of an optical disc.

2. Description of the Related Art

As an example of an optical recording medium onto or from which data is recorded or reproduced by light, for example, a disc-shaped optical disc is widely used.

In a data recording and reproducing device for an optical disc, in a state with the optical disc rotated at high speed, light is generated by a light emitting element within an optical pickup, and this light is radiated from the optical pickup onto the optical disc as a light beam, thereby executing a data recording and reproducing operation. At this time, by performing focus control and tracking control accurately with respect to the optical pickup, the light beam from the optical pickup is accurately radiated to the track in the signal recording surface of the optical disc.

In the related art, there is an optical recording and reproducing device in which light from a light emitting element is attenuated in a path within an optical pickup by light attenuating means at the time of data reproduction, and the light attenuating section is retracted from the path at the time of data recording (see, for example, Japanese Unexamined Patent Application Publication No. 6-131638).

According to Japanese Unexamined Patent Application Publication No. 6-131638 mentioned above, an ND (neutral density) filter is suitably used as the light attenuating means. As the means for driving the ND filter, an ND filter driving section that moves the ND filter into and out of the above-mentioned optical path is disclosed.

The reason for inserting the ND filter into the above-mentioned optical path in Japanese Unexamined Patent Application Publication No. 6-131638 is, in a word, to reduce reproduction noise.

More specifically, in the case of an optical recording and reproducing device, it is necessary to set the optical power density at the recording surface higher at the time of recording than at the time of reproduction. Thus, a high-output laser diode (LD) is generally used as the light emitting element. In the case of a high-output LD, the light quantity does not becomes stable if the laser emission power is set low at the time of reproduction, and this is likely to cause a reduction in C/N (Carrier to Noise ratio) at reproduction. Accordingly, at the time of reproduction, it is necessary to make the laser emission power somewhat large while lowering the optical power density at the recording surface to a predetermined constant value.

These two mutually contradictory demands can be met by inserting the ND filter into the optical path at the time of reproduction.

SUMMARY OF THE INVENTION

When the output level of an LD is maintained at high level for a long period of time, degradation inside the element or at the light emitting end face becomes severe, resulting in a sharp decrease in the life of the LD. Accordingly, an LD has a critical level of laser output power at which its life sharply decreases. Thus, when in use, the laser output of an LD at the time of data writing is set to a low level that allows for a reasonable margin from the critical level.

Also, the LD is driven in such a way that a set laser output level can be attained. More specifically, as described in Japanese Unexamined Patent Application Publication No. 6-131638, a feedback control is performed in which a part of light emitted from the LD is subjected to photoelectric conversion, and on the basis of a voltage thus obtained, an automatic power control (APC) circuit drives the laser so as to keep the above-mentioned emitted light at a constant control target value.

There are cases when, in the middle of data recording while this feedback control is being performed, the light attenuating means such as the ND filter mentioned above is erroneously inserted into the emission path of light from the LD.

In such cases, the above-mentioned APC circuit determines that the emitted light quantity from the LD has sharply dropped, and thus performs a control to rapidly raise the emitted light quantity. Therefore, the greater the amount of attenuation provided by the light attenuating means such as the ND filter, the larger the amount of drive by which the LD is driven and, depending on the case, the output power of the LD is controlled beyond the above-mentioned critical level, to a region where the life of the LD drops sharply.

As a result, at the time of data writing, a damage may occur which causes a sharp decrease in the life of the LD.

The same problem can also occur in the case of a single-layer disc in which the recording layer of an optical disc is made of a single layer, and in the case of a multi-layer disc in which the recording layer is made of more than two layers.

For example, in the case of a two-layer disc, the LD emission power necessary at the time of data recording or reproduction is greater than that in the case of a single-layer disc. For this reason, in some cases, a control is performed in which the light attenuating means such as the ND filter is set to the retracted state when recording and reproducing data onto and from a two-layer disc, and the light attenuating means is set to the inserted state when recording and reproducing data onto and from a single-layer disc.

In this case, since the output power of the LD is made to differ depending on whether data is recorded and reproduced onto and from a single-layer disc or a two-layer disc, when recording data onto a two-layer disc, in particular, the LD is driven at a level near the above-mentioned critical level, and when reproducing data from a single-layer disc, the LD is driven at a level near a region where LD noise becomes problematic.

Thus, when, in the middle of recording or reproducing data onto or from a two-layer disc in a state with the ND filter retracted from the emission path of light from the LD, for example, the ND filter is erroneously inserted into the emission path due to a shock, the above-mentioned APC circuit determines that the emitted light quantity from the LD has sharply dropped, and thus performs a control to raise the emitted light quantity. Thus, there is a possibility that the output power of the LD is controlled beyond the above-mentioned critical level, to a region where the life of the LD sharply decreases.

It is thus desirable to effectively prevent a decrease in the life of a light emitting element due to a shock applied during recording (and reproduction) of data.

A data recording and reproducing device according to an embodiment of the present invention includes a light emitting element, a light emission control section, a light attenuating drive section, and a shock detection section.

The light emitting element generates light, and emits the light toward an optical recording medium.

The light emission control section feedback-controls an emitted light quantity from the light emitting element.

The light attenuating drive section includes a light attenuating section, and inserts the light attenuating section into an emission path of the light when performing reproduction of data from the optical recording medium and retracts the light attenuating section from the emission path when performing recording of data onto the optical recording medium.

The shock detecting section detects a shock of a magnitude that causes the light attenuating drive section to switch between the insertion and the retraction.

When the shock detecting section detects the shock during the recording of data, the light emission control section lowers a control target value of the emitted light quantity from a value set at the time of shock detection.

According to an embodiment of the present invention, it is preferred that the optical recording medium be an optical disc having two or more recording layers.

According to an embodiment of the present invention, it is preferred that the data recording and reproducing device further include a recording and reproduction control section that controls the recording and reproduction of data, and when the shock detecting section detects the shock during the recording of data, the recording and reproduction control section suspend the recording of data, and instruct the light emission control section to lower the control target value set at the time of the recording to the target control value that is set at the time of reproduction.

Further, it is preferred that the recording and reproduction control section resume the recording of data after instructing the light attenuating drive section to drive the light attenuating section into a state of the retraction.

Further, it is preferred that upon learning that the shock detecting section has detected the shock again during a period from the detection of the shock to the resuming of the recording, the recording and reproduction control section instruct the light attenuating drive section to drive the light attenuating section into the state of the retraction again.

A data recording and reproducing device according to another embodiment of the present invention includes: a light emitting element that generates light and emits the light toward an optical disc; a disc detecting section that detects whether the optical disc is a single-layer disc having a single recording layer or a multi-layer disc having two or more recording layers; a light emission control section that feedback-controls an emitted light quantity from the light emitting element; a light attenuating drive section that includes a light attenuating section, and inserts the light attenuating section into an emission path of the light when the optical disc is the single-layer disc, and retracts the light attenuating section from the emission path when the optical disc is the multi-layer disc; and a shock detecting section that detects a shock of a magnitude that causes the light attenuating drive section to switch between the insertion and the retraction. When the shock detecting section detects the shock during recording or reproduction of data, the light emission control section lowers a control target value of the emitted light quantity from a value set at the time of shock detection.

A camera device according to an embodiment of the present invention includes a shooting section, and a rotational drive section that imparts a rotational drive force to an optical disc, when recording data obtained from a signal from the shooting section onto the optical disc.

The camera device includes the same components as those previously described, that is, a light emitting element, a light emission control section, a light attenuating drive section, and a shock detecting section.

When the shock detecting section detects the shock during the recording of data, the light emission control section lowers the control target value from a value set before shock detection.

A data recording and reproducing method according to an embodiment of the present invention includes the steps of: generating light, emitting the light toward an optical recording medium, and feedback-controlling an emitted light quantity; inserting a light attenuating section into an emission path of the light when performing reproduction of data from the optical recording medium, and retracting the light attenuating section from the emission path when performing recording of data onto the optical recording medium; detecting a shock of a magnitude that causes a light attenuating drive section to switch between the insertion and the retraction; and lowering a control target value of the emitted light quantity from a value set before shock detection, when the shock is detected during the recording of data.

A data recording and reproducing method according to another embodiment of the present invention includes the steps of: generating light, emitting the light toward an optical disc, and feedback-controlling an emitted light quantity; detecting whether the optical disc is a single-layer disc having a single recording layer or a multi-layer disc having two or more recording layers; inserting a light attenuating section into an emission path of the light when the optical disc is the single-layer disc, and retracting the light attenuating section from the emission path when the optical disc is the multi-layer disc; detecting a shock of a magnitude that causes the light attenuating drive section to switch between the insertion and the retraction; and lowering a control target value of the light emission quantity from a value set before shock detection, when the shock is detected during recording or reproduction of data.

According to the above-mentioned configuration, at the time of recording data onto the optical recording medium, and at the time of reproducing data from the optical recording medium, the light emitting element generates light and emits the light to the optical recording medium.

The emitted light quantity from the light emitting element is feedback-controlled. In this case, the emitted light quantity is attenuated by the light attenuating drive section at the time of reproduction (or at the time of recording/reproduction onto/from a single-layer disc), and is not attenuated at the time of recording (or at the time of recording/reproduction onto/from a multi-layer disc).

On the other hand, an action that determines whether the light attenuating section attenuates the emitted light quantity or not, that is, a shock of a magnitude sufficiently large to cause the light attenuating section to switch between insertion into and retraction from the emission path of light, is constantly monitored by the shock detecting section.

When the above-mentioned shock is detected at the time of data recording (or at the time of both recording and reproduction), the light emission control section controls the light emitting element to lower the control target value of the emitted light quantity from the light emitting element from the value set at the time of shock detection.

Also, when the light attenuating section has actually moved from the retracted position to the inserted position due to a shock, the light emission control section detects a drop in emitted light quantity, and performs a feedback control so as to raise the output power of the light emitting element.

However, it takes time for the light attenuating section to move in response to a shock, and it also takes some time until the output power of the light emitting element is determined after the feedback control is started. Although all this takes place in just a short frame of time, usually, the time from the detection of a shock to the control to a control target is shorter than this time. Thus, the light emitting element is lowered in output power without its operating point entering a region where the life of the light emitting element is sharply increased, thus ensuring safety.

According to the present invention, it is possible to effectively prevent a decrease in the life of the light emitting element due to a shock applied during data writing (or during recording or reproduction of data).

DESCRIPTION OF THE PREFERRED EMBODIMENTS

While the present invention is applied to a data recording and reproducing device that records and reproduces data by light onto and from an optical recording medium, a disk-shaped optical disc can be exemplified as the optical recording medium.

Also, while the present invention is also applicable to a stationary-type data recording and reproducing device or the like, the present invention can be suitably implemented as a portable device to which a shock is likely to be applied during shooting (or reproduction), for example, a video camera device with a built-in drive for recording and reproducing data onto and from an optical disc.

Hereinbelow, an embodiment of the present invention will be described with reference to the drawings, by way of an example of a camera device that records and reproduces data onto and from an optical disc.

<Overall Configuration>

Figure 1:
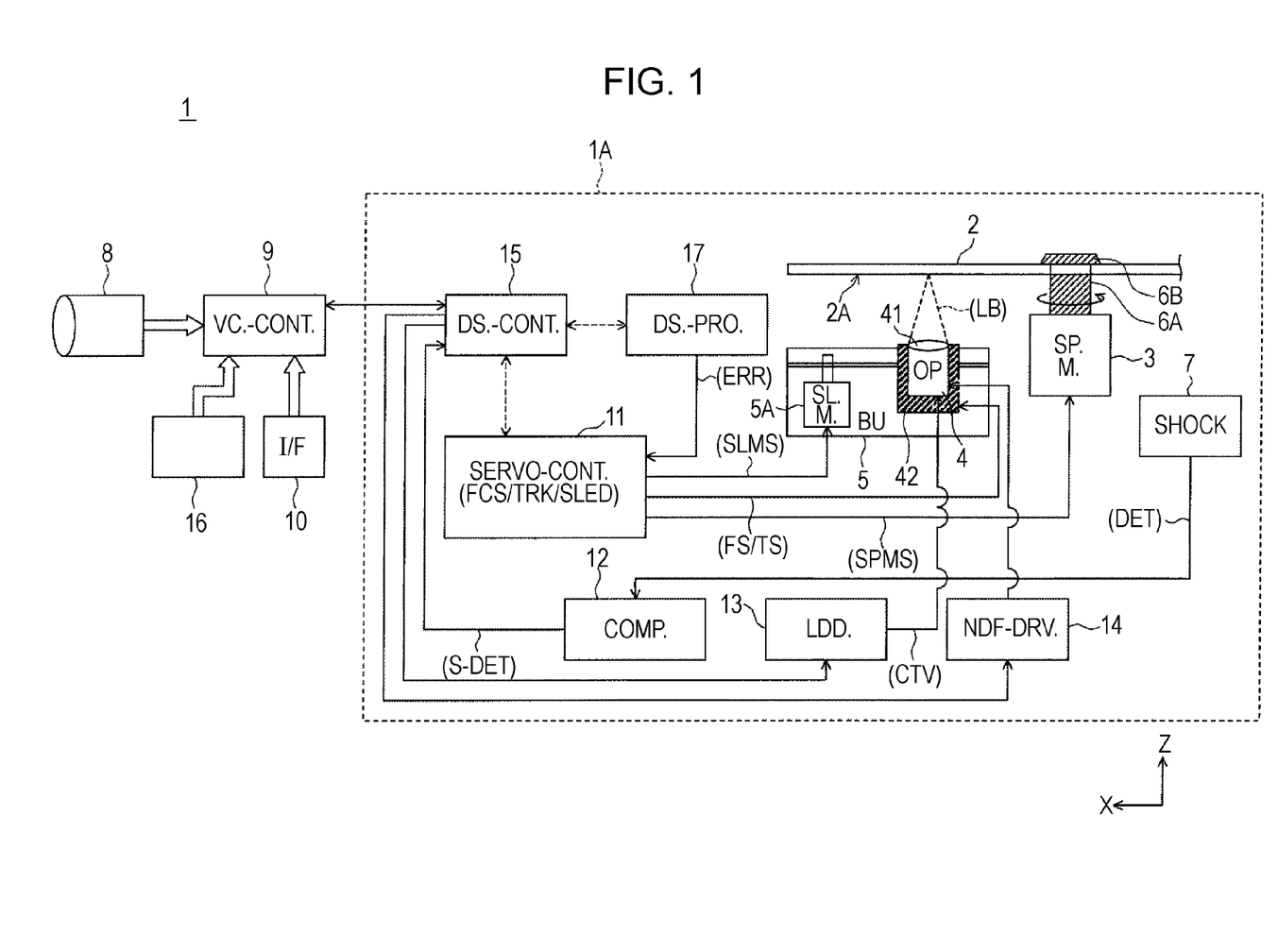
FIG. 1 is a block diagram showing the general configuration of a video camera device according to an embodiment of the present invention.
Figure 2:
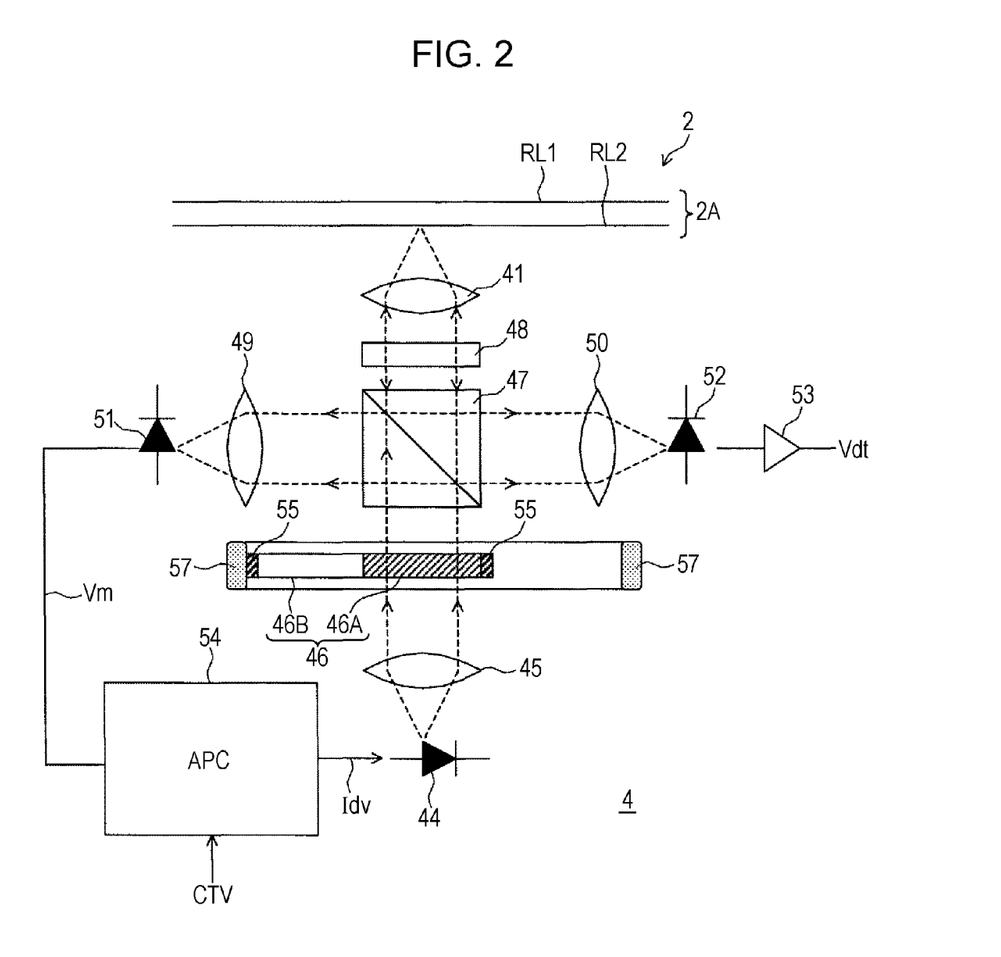
FIG. 2 is a diagram showing the general configuration of an optical pickup according to an embodiment of the present invention.

FIG. 1 is a block diagram showing the general configuration of a video camera device according to this embodiment. FIG. 2 shows the general configuration of an optical pickup.

A video camera device 1 illustrated in FIG. 1 detachably accommodates an optical disc 2 as an optical recording medium. The optical disc 2 has a disk-like outer shape with a diameter of about 12 [cm], such as a DVD-R/RW or a Blu-ray Disc (R). The optical disc 2 has a recording surface 2A including a recording layer provided on at least one surface of the optical disc 2 via a protective layer.

Around the optical disc 2 inside the video camera device 1, there are arranged a spindle motor (SP.M.) 3 for rotationally driving the optical disc 2, an optical pickup (OP) 4 that controls radiation of a light beam (LB) to the recording surface 2A of the optical disc 2, and a drive base unit (BU) 5 including a moving mechanism or drive source for moving the optical pickup 4 in the radial direction of the optical disc 2. A sled motor (SL.M.) 5A for moving the optical pickup 4 in the radial direction of the optical disc 2 is arranged inside the drive base unit 5.

A rotation support member called a tapered cone 6A is attached to a motor shaft (not shown) of the spindle motor 3. The optical disc 2 rotates at high speed (rotates on its own axis) due to a drive force from the spindle motor 3, in a state with one surface side in the peripheral portion of a central axial hole supported by the tapered cone 6A that is coupled to the spindle motor 3 and rotates on its own axis. At this time, the opposite side surface in the peripheral portion of the axial hole of the optical disc 2 is moderately pressed against a magnet member (chucking plate 6B).

The tapered cone 6A, the chucking plate 6B, and the spindle motor 3 each correspond to an example of "rotational drive section".

The optical pickup 4 includes a three-axis actuator 42 that is capable of moving an objective lens 41 in the radial direction (track direction) and normal direction (focus direction) of the optical disc 2, and is capable of tiling motion in a direction for correcting radial skew (or tangential skew).

As shown in FIG. 2, inside the optical pickup 4, there are provided a laser diode (LD) 44, a collimator lens 45, an ND filter 46A serving as a "light attenuating section", a polarization beam splitter 47, a polarizing plate 48, condenser lenses 49, 50, photo-detectors 51, 52, an amplifier 53, and an APC (Automatic Power Control) circuit 54, in addition to the objective lens 41.

The various optical parts and the like shown in FIG. 2 are arranged as described below with respect to the optical path.

Laser light from the LD 44 can be made incident on the polarization beam splitter 47 after passing through the collimator lens 45 and the ND filter 46A.

Most of the LD light made incident on the polarization beam splitter 47 travels in a straight line within the polarization beam splitter 47, and can be made incident on the objective lens 41 after passing through the polarizing plate 48.

The polarizing plate 48 is an optical part that converts incident light from linearly polarized light into circularly polarized light or the like, for example. The LD light that has undergone conversion by the polarizing plate 48 is collected by the objective lens 41, forming a light beam (LB) with higher optical power density, which is then radiated while being focused onto the recording surface 2A of the optical disc.

FIG. 2 illustrates an example of the recording surface 2A which is formed on the optical disc 2 such as a Blu-ray disc (BD) and has two recording layers. FIG. 2 shows a state in which the light beam (LB) is focused on a recording layer RL1 on the deep layer side of the recording surface 2A. In a case where the light beam is to be focused on a recording layer RL2 on the surface layer side, the three-axis actuator 42 in FIG. 1 performs focus control (focusing servo) by moving the objective lens 41 in the direction of the normal (vertical direction in FIG. 2). The focusing servo will be described later.

On the other hand, a part of, for example, about 1[%] of the LD light made incident on the polarization beam splitter 47 is reflected inside and changes its direction at a right angle before exiting the polarization beam splitter 47. The condenser lens 49, and the photo-detector 51 formed by, for example, a photodiode are arranged directly ahead of where the part of LD light (hereinafter, referred to as emitted monitor light) exits the polarization beam splitter 47. The condenser lens 49 is arranged so as to focus the emitted monitor light on the light-receiving surface of the photo-detector 51. Therefore, the emitted monitor light effectively undergoes photoelectric conversion in the photo-detector 51, and a monitor voltage Vm is outputted from the photo-detector 51.

Connected between the photo-detector 51 and the LD 44 is an APC circuit 54 that receives an input of the monitor voltage Vm of the photo-detector 51 and controls a drive current Idv of the LD 44. A control target value (voltage; CTV) is given to the APC circuit 54 from the outside. The APC circuit 54 is a circuit that amplifies the inputted monitor voltage Vm for conversion into the drive current Idv, so that predetermined output power can be obtained by the LD 44 in accordance with the control target value (CTV).

Feedback control for LD drive is performed by the polarization beam splitter 47, the condenser lens 49, the photo-detector 51, and the APC circuit 54, so the output power of the LD 44 is controlled in such a way that a desired optical power density can be obtained at the recording surface 2A in a stable manner. As will be described later, the control of changing the output power of the LD 44 between when recording data and when reproducing data is performed in accordance with the control target value (CTV).

Reflected light from the recording surface 2A passes through the objective lens 41 and the polarizing plate 48 before being made incident on the polarization beam splitter 47. Since the polarization plane of the reflected light is orthogonal to that of the light emitted from the LD, no mutual interference occurs, and almost all of the reflected light is bent inside the polarization beam splitter 47 in a direction opposite to the emitted monitor light of the LD before exiting the polarization beam splitter 47. The condenser lens 50, and the photo-detector 52 formed by, for example, a photodiode are arranged directly ahead of where this reflected light exits the polarization beam splitter 47. The condenser lens 50 is arranged so that the reflected light is focused on the light-receiving surface of the photo-detector 52. Therefore, the reflected light effectively undergoes photoelectric conversion in the photo-detector 52, and a photo-detection voltage Vdt is outputted from the photo-detector 51.

The photo-detection voltage Vdt is used for the control of a focusing servo or tracking servo at the time of data recording, and is also used for data detection at the time of data reproduction. Thus, the photo-detector 52 can detect a focus error or a tracking error.

As previously described, inside the optical pickup 4 according to this embodiment, the ND filter 46A is provided within the emission path of LD light between the LD 44 and the polarization beam splitter 47. The ND filter 46A is integrally formed from, for example, glass, together with a total light transmission section 46B not having the ND filter 46A. Hereinafter, a member including the ND filter 46A and the total light transmission section 46B is referred to as an ND filter plate 46.

Magnets 55 are affixed to the opposite ends of the ND filter plate 46, for example. The ND filter plate 46 is accommodated in a filter frame body 56, and is held in a manner that allows reciprocating motion in a direction orthogonal to the emission path of LD light. On the other hand, electromagnetic coils 57 are provided on the side of the filter body frame 56 facing the two magnetic 55 mentioned above. The two electromagnetic coils 57 are driven by current from the outside so that when one of the electromagnetic coils 57 attracts one of the magnets 55, the other electromagnetic coil 57 pushes back the other magnet 55.

This allows the ND filter plate 46 to switch between an "inserted state" in which the ND filter 46A is inserted in the emission path of LD light, and a "retracted state" in which the ND filter 46A is retracted from the emission path and instead the total light transmission section 46B is instead into the emission path, in accordance with the direction of the above-mentioned drive current or the like.

Returning to the description of FIG. 1, a shock sensor (SHOCK) 7 is provided as a component of a "shock detecting section" that detects a shock due to an external force applied to the optical recording medium (optical disc 2).

The configuration of the shock sensor 7 may be arbitrary, as far as the shock sensor 7 can detect an external force that causes or is likely to cause the ND filter plate 46 in FIG. 2 to switch between the "inserted state" and the "retracted state".

The video camera device 1 has a shooting section 8 that shoots a subject, processes a shooting signal corresponding to the shot image, and outputs the shooting signal.

The shooting section 8 includes optical parts such as an optical lens and a filter, and mechanical parts such as a shutter.

The video camera device 1 has a video camera control section (V.C.-CONT.) 9, and an optical disc drive device 1A. The video camera control section 9 is connected with an interface (I/F) 10 that allows an input of a signal (image signal) from an external terminal (not shown) or an output of a signal to the external terminal, and an operating section 16.

The optical disc drive device 1A has a servo control section (SERVO-CONT.) 11, a drive system control section (DS.-CONT.) 15, and a drive signal processing section (DS.-PRO.) 17. The above-described "rotational driving section" including the spindle motor 3, and the drive base unit 5 including the optical pickup 4 are provided inside the disk drive device 1A. Although will be described later in detail, a command from the video camera control section 9 is received by the drive system control section 15, and a recording operation or a reproducing operation is performed by control of the drive system control section 15.

An error signal (ERR) from the drive signal processing section 17 can be inputted to the server control section 11. The servo control section 11 performs the various controls mentioned above on the basis of the inputted error signal (ERR). At this time, the servo control section 11 outputs a focusing servo signal (FS) or a tracking servo signal (TS) to the three-axis actuator 42. Also, a spindle motor servo signal (SPMS) generated by the servo control section 11 is outputted to the spindle motor 3, and a sled motor servo signal (SLMS) generated by the servo control section 11 is outputted to the sled motor 5A.

Through this configuration, the servo control section 11 can perform a focusing servo and a tracking servo with respect to the optical pickup 4, and can perform a rotational speed control with respect to the spindle motor 3.

The video camera device 1 includes, as components related to the characteristic feature of the present invention, a comparator (COMP.) 12 that compares a detection signal (DET) outputted from the shock sensor 7 against a predetermined threshold, an LD driving circuit (LDD) 13, and an ND filter driving circuit (NDF-DRV.) 14.

The comparator 12, the LD driving circuit 13, and the ND filter driving circuit 14 are controlled by the drive system control section 15. Thus, the drive system control section 15 is connected to the comparator 12, the LD driving circuit 13, and the ND filter driving circuit 14, and is further connected to the video camera control section 9, the interface 10, and the servo control section 11 as well.

The comparator 12 can be also implemented as software as one function of the drive system control section 15 controlled in accordance with a program. It should be noted, however, that in this example, the comparator 12 is formed by hardware (circuit) separately from the drive system control section 15.

The comparator 12 retains the above-mentioned threshold indicating the magnitude of the minimum shock at which the ND filter plate 46 in FIG. 2 switches between the "inserted state" and the "retracted state". When the comparator 12 compares a detection signal (DET) from the shock sensor 7 against the threshold, and the detection signal (DET) is equal to or larger than the threshold, the comparator 12 outputs a shock detection signal (S-DET) to the drive system control section 15. The threshold may be given to the comparator 12 from the system control section 15 in a changeable manner. Also, the threshold may be determined on the basis of the retention of the ND filter with a safety factor taken into account. In this case, the threshold actually used by the comparator 12 is a value obtained by multiplying a threshold corresponding to the magnitude of the minimum shock at which the ND filter plate 46 switches, by a safety factor of less than 1.

The shock sensor 7 and the comparator 12 each correspond to an example of the "shock detecting section".

The LD driving circuit 13 is connected between the drive system control section 15 and the optical pickup 4. Also, likewise, the ND filter driving circuit 14 is connected between the drive system control section 15 and the optical pickup 4.

The LD driving circuit 13 performs a control of switching the control target value (CTV) given to the APC circuit 54 in FIG. 2 between when recording data and when reproducing data, in accordance with an instruction from the drive system control section 15.

Also, in response to an input of the shock detection signal (S-DET) from the comparator 12, the drive system control section 15 instructs the LD driving circuit 13 to lower the control target value (CTV), and also instructs the ND filter driving circuit 14 to drive the ND filter plate 46. The details of this control performed in response to shock detection will be described later.

The LD driving circuit 13, the drive system control section 15, and the components for effecting feedback control in FIG. 2, that is, the polarization beam splitter 47, the condenser lens 49, the photo-detector 51, and the APC circuit 54 each represent an example of a "light emission control section". The drive system control section 15 as a "disc detecting section" has a function of detecting whether the optical disc 2 is a single-layer disc or a multi-layer disc. As for this disc type detection, the disc type may be detected optically or may be detected mechanically. The drive system control section 15 also functions as a "recording and reproduction control section".

Also, the "light emission control section" has a function of feedback-controlling the emitted light quantity from the LD 44 to a predetermined target value.

Also, the ND filter driving circuit 14, and the ND filter plate 46, the magnets 55, the filter frame body 56, the electromagnetic coils 57, and the like in FIG. 2 each represent an example of a "light attenuating drive section".

<Recording and Reproducing Operation>

Next, with the above-mentioned configuration assumed as a prerequisite, the general operation of the video camera device 1 will be described.

When a shooting start button within the operating section 16 is pressed, recording is started by the video camera control section 9, and an image signal is converted into a recording signal. The recording signal is recorded onto the disc via the drive system control section 15.

More specifically, when the shooting start button is pressed, a shooting signal outputted from the shooting section 8 is inputted to the video camera control section 9, and is converted into a recording signal by the video camera control section 9. The recording signal is sent from the video camera control section 9 to the optical pickup 4 via the drive system control section 15, and is written onto the optical disc 2 by the optical pickup 4.

For this LD light emission at the time of recording, an instruction for switching to the control target value (CVT) that is set at the time of recording is issued in advance from the LD driving circuit 13 controlled by the drive system control section 15, to the APC circuit 54 in response to a shooting start instruction.

Therefore, the LD 44 emits light at output power necessary for data recording, and the emitted light (LD light) is radiated to the recording layer RL1 or RL2 as a light beam (LB) made incident on the recording surface 2A of the optical disc 2. Thus, a property-changing region (mark) of a length corresponding to data is formed intermittently in the recording layer RL1 or RL2.

At this time, for example, a mark is continuously formed at a track position that moves from the inner circumference side to the outer circumference as the optical disc 2 rotates, thereby executing data recording.

During data recording, reflected light is received by the photo-detector 52 within the optical pickup 4, and the photo-detection voltage Vdt is constantly inputted from the photo-detector 52 to the drive signal processing section 17. Under the control of the drive system control section 15, the drive signal processing section 17 generates a focus error signal indicating the amount of deviation between the focusing position of a light beam (LB) and the recording surface 2A of the optical disc 2, and also generates a tracking error signal indicating the amount of deviation between the radiation position of a light beam (LB) and a desired track. These signals are sent to the servo control section 11 as error signals (ERR).

The servo control section 11 controls the three-axis actuator 42 on the basis of the inputted error signals (ERR), and moves the objective lens 41 along the two axes of the X axis (axis in the radial direction) and the Z axis (axis in the direction of the normal).

More specifically, feedback control for focusing a light beam (LB) onto the recording surface 2A of the optical disc 2, that is, focus control is performed by moving the objective lens 41 in a direction toward or away from the optical disc 2 (Z-axis direction) so as to reduce a focus error signal.

In parallel with this, feedback control for making the focus of a light beam (LB) follow a desired track, that is, tracking control is performed by moving the objective lens 41 to the outer circumference side or inner circumference side (X direction) of the optical disc 2 so as to reduce a tracking error signal.

Tracking control becomes difficult if a light beam (LB) is not properly focused on the track at the time of tracking control at the initial stage of control or the like. Accordingly, in such a case, the servo control section 11 first causes the sled motor 5A to roughly move the optical pickup 4 in the X direction, and then causes the three-axis actuator 42 to perform more precise tracking control. Thereafter, focus control and tracking control are performed in parallel, so the focus of a light beam (LB) can be made to follow a desired track.

To reproduce data, a reproducing instruction is issued to the drive system control section 15 via the video camera control section 9 on the basis of an operation on the operating section 16. Then, the spindle motor 3 is activated via the servo control section 11 and, at the same time, through control of the servo control section 11, the optical pickup 4 is moved by the sled motor 5A within the drive base unit 5 to seek a track position corresponding to a location where data to be reproduced is recorded, and reproduction is started.

When a continuous light beam (LB) from the optical pickup 4 is radiated to the recording surface 2A of the optical disc 2 at the time of data reproduction, due to a difference in reflectance between mark and non-mark portions of the recording layer RL1 or RL2, reflected light becomes modulated in accordance with the recording signal. The reflected light is made incident on the photo-detector 2, and subjected to photoelectric conversion. A reproduction signal obtained by the photoelectric conversion is outputted from the photo-detector 52, and the reproduction signal is amplified by the amplifier 53 before being inputted to the drive signal processing section 17.

After undergoing predetermined processing in the drive signal processing section 17, the reproduction signal is outputted as an image or sound from a display section, speaker, or the like (not shown). Alternatively, the processed reproduction signal can be outputted to the outside via the interface 10 and an external terminal (not shown).

At the time of recording or reproduction described above, the quantity of emitted light beam (LB) is monitored by the photo-detector 51 used for monitoring the LD light quantity, and the APC circuit 54 connected to the photo-detector 51.

That is, a part of (1 to several [%]) of light emitted from the LD at the time of recording or reproduction is inputted to the photo-detector 51, and in accordance with the monitored light quantity, a drive current Idv of the LD 44 is subjected to feedback control so that a control target value (CTV) that has been set can be attained. Thus, even when there are changes over time in or disturbances to the LD light quantity, the average light quantity of a light beam (LB) at the time of recording or reproduction becomes a desired constant value.

While the APC circuit 54 in FIG. 2 may be provided within the LD driving circuit 13 in FIG. 1, it is desired to provide the APC circuit 54 within the optical pickup 4 as shown in FIG. 2 because a quick response can be attained.

<Optical Disc having a Plurality of Recording Layers>

While the present invention is suitably used for recording/reproducing data onto/from an optical disc having a single recording layer, due to the reason described below, the present invention is also suitably used for recording/reproducing data onto/from an optical disc having more than two recording layers, such as a Blu-ray Disc (BD).

In a case where, for example, two recording layers are formed as shown in FIG. 2 on the recording surface 2A of the optical disc, when recording is performed by focusing the spot of a light beam onto the recording layer RL2 on the surface layer side, the optical power density at the other recording layer RL1 on the deep layer side becomes quite high, although not as high as that at the recording layer RL2 on the surface layer side. Conversely, when recording is performed by focusing the spot of a light beam onto the recording layer RL1 on the deep layer side, the optical power density at the other recording layer RL2 on the surface layer side becomes quite high, although not as high as that at the recording layer RL1 on the deep layer side.

As described above, when performing optical recording with respect to one of the recording layers, the other recording layer is exposed to beam light with high optical power density. Thus, the recording layer sensitivity (sensitivity at which a readable change in reflectance (change in property) occurs by radiation of light) of the optical disc 2 having a plurality of recording layers is set lower than the recording layer sensitivity of a single-layer optical disc.

Figure 3:
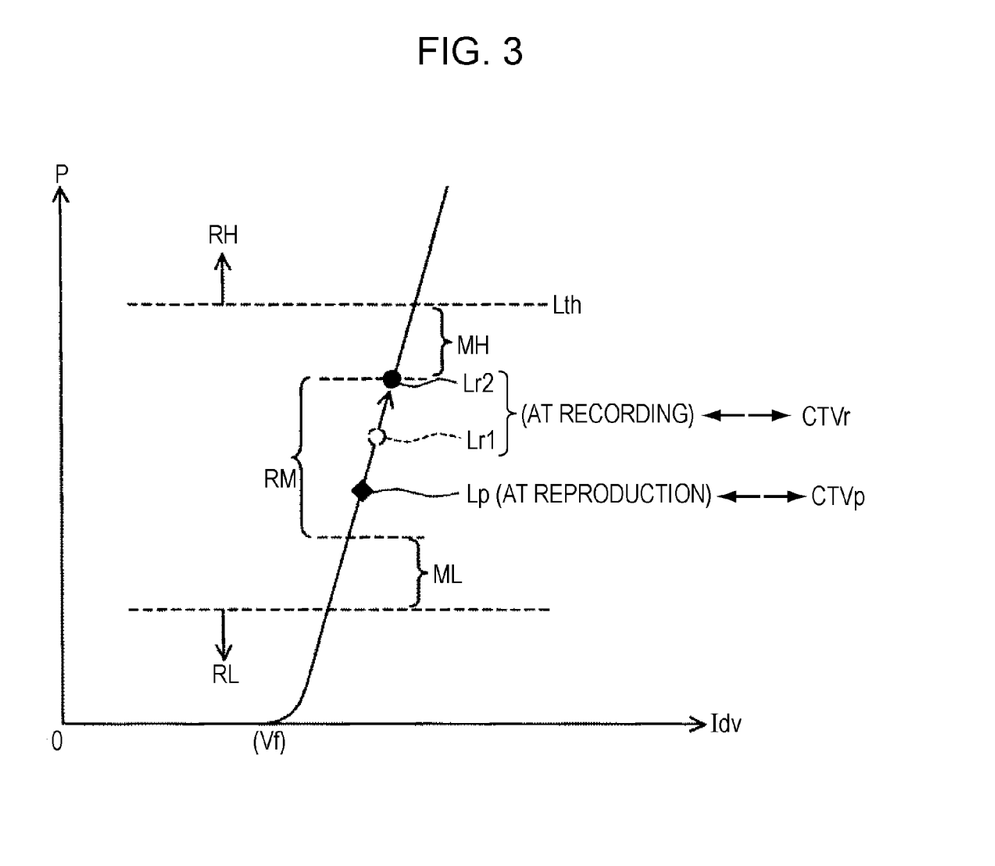
FIG. 3 is a graph used for illustrating an embodiment of the present invention, schematically showing the relationship between the drive current and output power of an LD.

FIG. 3 is a graph schematically showing the relationship (light emission characteristic) between the drive current Idv (horizontal axis) and output power P (vertical axis) of the laser diode (LD 44). The output power P represented by the vertical axis in this graph corresponds to brightness provided that the diameter of LD light is the same.

The light emission characteristic is such that as the drive current Idv is increased, the output power P rises from a voltage Vf. Under this light emission characteristic of the LD, in the vicinity of a region RL where the output power P is small, the stability of output is low, which increases noise. On the other hand, in a region RH above a critical level Lth where the output power P is very high, the life of the laser drops sharply. Accordingly, the LD 44 is used within a region RM between the region RL and the region RH, with sufficient margins ML and MH from the respective regions.

When recording data and when reproducing data, while it is necessary to heat the recording surface of the optical disc 2 to a given temperature or more at the time of recording, it is necessary to ensure that recorded data is not erroneously deleted at the time of reproduction. Thus, an output power level Lp at reproduction is set sufficiently lower than an output power level Lr (Lr1, Lr2) at recording.

It is to be noted here that FIG. 3 shows strictly an ideal case. In actuality, to reduce reproduction noise, it may be difficult to set the output power level Lp at reproduction low, and thus the difference (operating margin) between the output power level Lp at reproduction and the output power level Lr at recording may not be sufficient in some cases. That is, there is a tradeoff between the reduction of reproduction noise and the setting of an operating margin at recording and reproduction.

As shown in FIG. 2 and as previously described, the reason why the ND filter plate 46 is switched between when performing reproduction and when performing recording is to attenuate the LD output within its path only at the time of reproduction so that, in order to overcome this tradeoff, the optical power density at the recording surface of the disc is kept low even when the LD output at reproduction is set large.

The ND filter plate 46 is controlled as the control target value (CTV) given from the LD driving circuit 13 in FIG. 1 to the APC circuit 54 in FIG. 2 switches between a reproduction control target value (CTVp) and a recording control target value (CTVr).

As previously described, the recording layer density of the optical disc 2 having a plurality of recording layers such as a Blur-ray Disc (BD) is lower than that of an optical disc having a single recording layer.

Therefore, as shown in FIG. 3, even when the output power level Lr1 at recording of a single-layer disc is set at a position sufficiently below the margin MH, as for the output power level Lr2 at recording of a two-layer disc, since the recording layer sensitivity is relatively low, the LD 44 is used with its output power raised and set at a position very close to the edge of the margin MH.

When, at data recording, the ND filter 46A of the ND filter plate 46 switches from the "retracted state" to the "inserted state" due to a shock, the quantity of light incident on the polarization beam splitter 47 drops sharply. At this time, in order to achieve a high recording control target value (CTVr) being given, the APC circuit 54 drives the LD 44 so as to increase the drive current Idv greatly.

As a result, the output power level Lr2 at recording which lies very close to the edge of the margin MH easily enters the region RH, so the life of the LD 44 drops at a speed far exceeding the speed at the time of normal use.

<Processing at the Time of Shock Detection During Data Recording>

Figure 4:
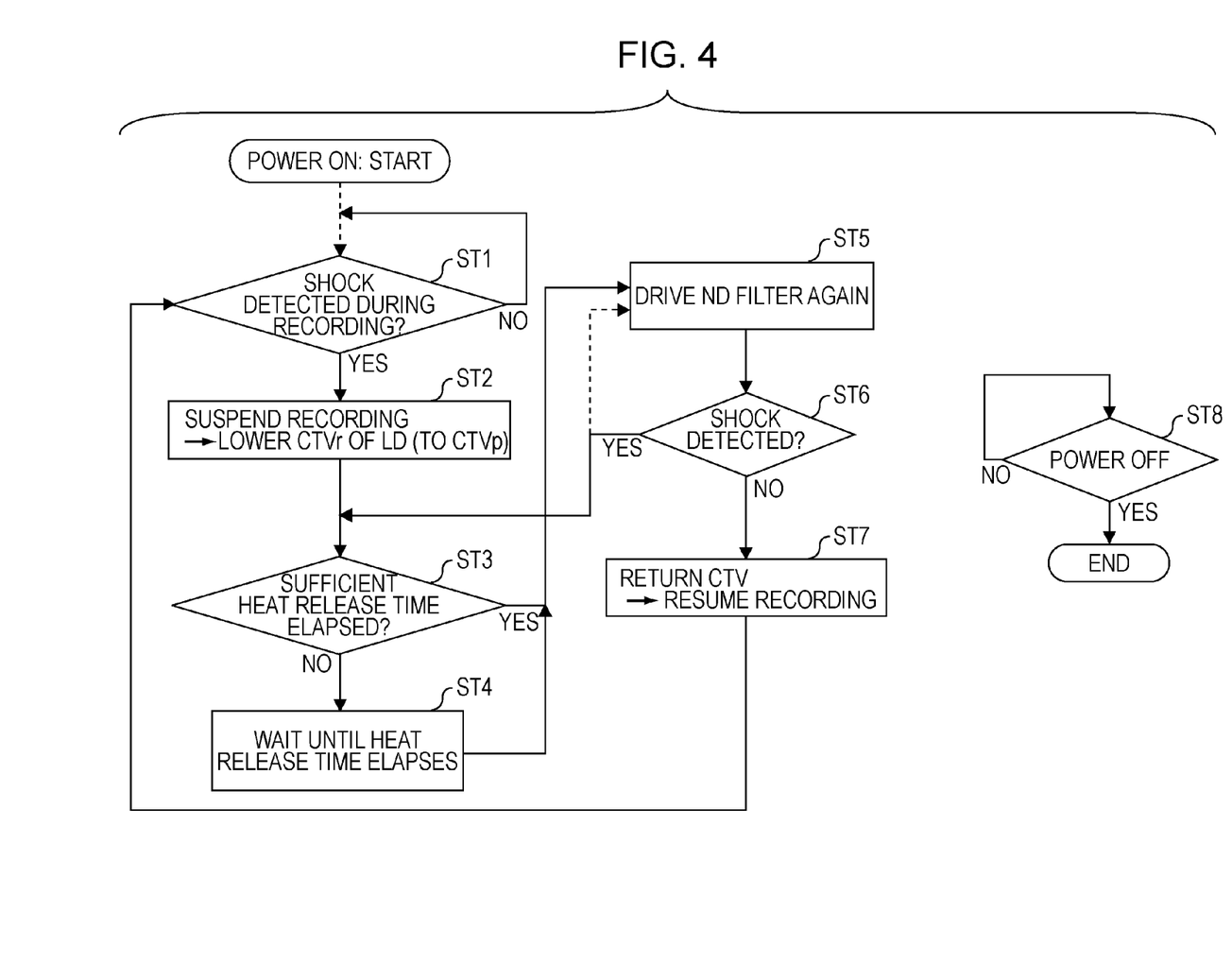
FIG. 4 is a flowchart of processing at the time of shock detection in a data recording and reproducing method according to an embodiment of the present invention.

FIG. 4 shows a flow of processing at the time of shock detection.

The processing at the time of shock detection shown in FIG. 4 is started when the power of the video camera device 1 is turned ON, and the drive system control section 15 activates.

After the power is turned ON, shooting is performed, and data recording is started after various steps (not shown). The various steps include an ND filter drive in which, when the ND filter is not at the position for recording, that is, if the ND filter 46A is inserted in the emission path of LD light, the ND filter 46A is retracted from the emission path. Even if the ND filter 46A is at the position for recording (in the inserted state) from the beginning, an ND filter drive to the "inserted state" is performed by way of precaution.

After power is supplied to the drive system control section 15 and the comparator 12 in FIG. 1, a detection signal (DET) from the shock sensor 7 is compared against a threshold by the comparator 12. On the basis of the comparison result, "detection of a shock during recording" in step ST1 becomes possible.

If "detection of a shock during recording" has been made using the comparator 12 and the drive system control section 15, that is, if the answer to step ST1 is "YES", the process flow proceeds to the next step ST2. If a shock has not been detected ("NO"), step ST1 is repeated until a shock is detected.

The term "shock detection" as used herein refers to detection of the magnitude of the minimum shock that causes the ND filter plate 46 to switch between the "inserted state" and the "retracted state", or the magnitude of a shock slightly smaller than the above-mentioned minimum shock, which is obtained by multiplying the magnitude of the minimum shock by a safety factor.

In step ST2, even if a great shock is applied and the ND filter plate 46 switches from the "retracted state" during recording to the "inserted state", recording is suspended before the output power of the LD 44 is raised by feedback control. Subsequently, the recording target control value (CTVr) is forcibly reduced to a lower value, for example, to the reproduction control target value (CTVp). In a case where the above-mentioned safety factor is applied, control is executed such that even if switching of the ND filter has not actually occurred, the recording control target value (CTVr) is lowered upon detecting a shock that is so great that switching of the ND filter is likely to occur.

In the next step ST3, it is checked by the drive system control section 15 whether "sufficient heat release time has elapsed".

This checking of the waiting time is provided for the following reason. That is, in the case of a so-called plunger type (uniaxial movement type) ND filter drive powered by the electromagnetic force of the electromagnetic coils 57, a very large current flows in the electromagnetic coils 57. Thus, there is a fear that when repeating the drive at short intervals, this may lead to a decrease in drive force due to heat generation. Thus, if there is no such fear, or in the case of employing other types of ND filter drive, step ST3 and the next waiting process (step ST4) can be omitted.

If it is determined in step ST3 that a sufficient heat release time has elapsed ("YES"), in step ST5, re-driving of the ND filter is performed.

On the other hand, if the result of the determination in step ST3 is "NO", after waiting for the elapse of the heat release time in step ST4, re-driving of the ND filter is performed in the next step ST5.

Re-driving of the ND filter is accomplished when, for example, the drive system control section 15 references a built-in timer, and issues an instruction for starting a drive to the ND filter driving circuit 14 at a timing when a predetermined period of time has elapsed since the last filter drive, and in response to this instruction, the ND filter driving circuit 14 returns the ND filter plate 46 in FIG. 2 to the position for recording.

Thereafter, in step ST7, a process of returning the control target value (CTV) lowered in step ST2 to the recording control target value (CTVr) is performed. At this time, between step ST1 and step ST7, a step ST6 in which the drive system control section 15 checks whether or not a shock has been detected is provided separately from step ST1.

Step ST6 is provided to verify a position of the ND filter as being the correct position.

More specifically, if a shock is detected only once in step ST1, it can be determined that the ND filter has been moved to the correct position for recording through the drive in step ST5. However, if a shock is detected one more time, this may mean that the ND filter has been returned to the correct position for recording after a total of two shock applications.

Accordingly, step ST6 is provided so that if a shock has been detected twice including the detection in step ST1 ("YES"), by way of precaution, to perform re-driving of the ND filter again, the process flow is returned to a point before step ST3. In this case, since a sufficient heat release time is considered to have elapsed, it also suffices to simply return the process flow be simply to a point before step ST5, and carry out the ND filter drive again.

In step ST7, after the control target value (CTV) that has been lowered is returned to the recording control target value (CTVr), recording is resumed by the drive system control section 15, and the process flow returns to the processing of step ST1.

The processing of step ST6 is unnecessary in the case of employing a drive method in which the ND filter drive in step ST5 does not only move the ND filter from the current position to the opposite side but also involves surely "moving the ND filter to the position for recording" or "moving the ND filter to the reproduction position". This is because, in this case, even without step ST6, detection of a shock is performed immediately after recording is resumed in the next step ST7, so the second shock detection mentioned above is performed at this time, and the control target value (CTV) is lowered immediately. Hence, there is no real harm in not providing step ST6.

When a termination such as power OFF is detected in step ST8 during the above-mentioned processing, this process flow ends.

<Processing at the Time of Shock Detection During Data Reproduction>

Now, a brief description will be also given of the processing during data reproduction.

When, during data reproduction, the light attenuating section such as the ND filter 46A erroneously retracts from the emission path of light from the LD 44 due to an external shock, the optical power density at the optical disc surface rises sharply. At this time, the APC circuit 54 simultaneously lowers the output power of the LD 44 in accordance with the reproduction control target value (CTVp) that is relatively low, so the rise in the optical power density at the optical disc surface is only temporary, and the optical power density soon returns to a predetermined level.

However, such a transient variation in the optical power density at the optical disc surface causes noise in a reproduction signal, resulting in a deterioration in reproduction quality.

To prevent a deterioration in reproduction quality, it is desirable that the video camera device 1 execute the following processing.

In the video camera device 1, normally, decoding of an ECC (Error Correction Code) is performed at the time of reproduction, and on the basis of the result of the decoding, it is determined whether or not recorded data has been properly restored (reproduced). Then, if recorded data has not been properly decoded, an operation of reading the same data again (read retry operation) occurs.

Therefore, even when there is the transient variation in optical power density mentioned above, if it is determined that data has been properly restored, no deterioration in reproduction quality occurs. On the other hand, even if it is determined that data has not been properly restored, since the above-mentioned read retry operation occurs, there is no deterioration in reproduction quality.

<Modifications>

The foregoing description is directed to a case where the ND filter 46A is set to the "retracted state" at the time of data recording, and the ND filter 46A is set to the "inserted state" at the time of data reproduction.

In this embodiment, the ND filter 46A may be set to the "inserted state" at both recording and reproduction of data in the case of a single-layer disc in which the recording surface 2A of the optical disc 2 has a single layer, and the ND filter 46A may be set to the "retracted state" at both recording and reproduction of data in the case of a multi-layer disc whose recording surface 2A has multiple layers.

In the case of a single-layer disc, there may be times when the output power of the LD at recording is set by allowing for a sufficient margin from a region where the life of the LD sharply decreases, but the output power at reproduction is set without allowing for a sufficient margin from a region where noise increases. For this reason, when the ND filter switches from the "inserted state" to the "retracted state" due to a shock, and the output power of the LD is lowered in response to this, a decrease in the quality of reproduced data resulting from the transient response often occurs, particularly at the time of data reproduction.

However, this problem can be avoided by the above-described read retry operation performed in accordance with the result of ECC decoding.

In contrast, since the LD output power at recording is lower in the case of a single-layer disc than in the case of a multi-layer (for example, two-layer) disc, when the ND filter switches from the "inserted state" to the "retracted state" due to a shock at the time of data recording, and the output power of the LD is lowered in response to this, the resulting light emission is such that it may become temporarily difficult to perform data recording properly due to the transient response, resulting in a deterioration in recording quality.

On the other hand, in the case of a multi-layer disc, even when a shock is applied at the time of data recording and reproduction, this causes the ND filter to switch from the "retracted state" to the "inserted state", and the output power of the LD is raised in response to this. Thus, at the time of reproducing data, the LD output power does not enter a region where noise increases.

In contrast, since the sensitivity of the recording layer of a multi-layer disc is set lower than the sensitivity of the recording layer of a single-layer disc, the ND filter is used in the "retracted state", so the output power of the LD at recording has a small margin with respect to the critical level at which the life of the LD sharply increases.

Therefore, when, at the time of data recording, the ND filter switches from the "retracted state" to the "inserted state" due to a shock, and the output power of the LD is raised in response to this, the output power of the LD at recording often exceeds the critical level, resulting in a sharp decrease in the life of the LD. Also, there is a problem in that due to the transient response at the time of data recording, the recording quality of data temporarily deteriorates.

According to this modification, upon detecting a shock that would cause the ND filter to switch, the control target value in the feedback control of the LD is lowered, thereby making it possible to effectively prevent a sharp increase in LD life, particularly at the time of writing data onto a two-layer disc, and a deterioration in data recording quality due to the transient response.

As for the deterioration in data recording quality due to the transient response at the time of data recording onto a single-layer disc, the control target value in the feedback control of the LD may be raised only in this case, that is, only when "the disc is a single-layer disc" and "at the time of data recording".

Further, there are cases where a deterioration in data recording quality due to the transient response also occurs in the case of a control in which the ND filter is set to the "retracted state" at the time of data recording and is set to the "inserted state" at the time of reproduction.

Next, other modifications will be described.

Although the foregoing description does not provide details of how rotation of the optical disc 2 is controlled, the control method may be either varying the rotational speed of the optical disc 2 so as to keep the linear velocity constant by the CLV (Constant Linear Velocity) method, or keeping the rotational speed of the optical disc 2 constant by the CAV (Constant Angular Velocity) method.

Also, the optical disc 2 is not limited to a Blu-ray Disc (BD) but may be, for example, various kinds of optical disc such as a DVD (Digital Versatile Disc) or a CD (Compact Disc). Further, the diameter of the optical disc 2 is not limited to 120 [mm] but may be 80 [mm] or the like.

The embodiment mentioned above provides the following advantages.

When a shock is detected at the time of data recording, at the time of recording data, the light emitting element (LD 44) is forcibly driven to lower emission power. It is thus possible to avoid a situation where the life of the light emitting element sharply decreases due to unintended switching of the ND filter due to a shock.

Also, in particular, in either of the above-described control in which the ND filter is set to the "retracted state" at the time of data recording irrespective of whether the disc has a single layer or multiple layers, and the control according to the modification in which the ND filter is constantly set to the "retracted state" at the time of recording and reproduction onto and from a multi-layer disc, it is possible to avoid a situation where the data recording quality deteriorates due to the transient response.

Further, by detecting a shock and performing re-driving of the ND filter, the ND filter be returned to an appropriate setting with reliability before resuming a recording operation.

In a case where, at the time of data reproduction, a deterioration in reproduction quality occurs due to a shock, a read retry operation is performed in accordance with the result of ECC decoding, for example, thus making it possible to obtain reproduced data of a quality sufficient for practical use.

It should be understood by those skilled in the art that various modifications, combinations, sub-combinations and alterations may occur depending on design requirements and other factors insofar as they are within the scope of the appended claims or the equivalents thereof.

What is claimed is:

1. A data recording and reproducing device comprising:
a light emitting element that generates light and emits the light toward an optical recording medium;
a light emission control section that feedback-controls an emitted light quantity from the light emitting element;
a light attenuating drive section that includes a light attenuating section, and inserts the light attenuating section into an emission path of the light when performing reproduction of data from the optical recording medium and retracts the light attenuating section from the emission path when performing recording of data onto the optical recording medium; and
a shock detecting section that detects a shock of a magnitude that causes the light attenuating drive section to switch between insertion and retraction,
wherein when the shock detecting section detects the shock during the recording of data, the light emission control section lowers a control target value of the emitted light quantity from a value set at a time of shock detection.

2. The data recording and reproducing device according to claim 1, further comprising:
a recording and reproduction control section that controls the recording and reproduction of data,
wherein when the shock detecting section detects the shock during the recording of data, the recording and reproduction control section suspends the recording of data, and instructs the light emission control section to lower the control target value set at a time of the recording to a target control value that is set at a time of reproduction.

3. The data recording and reproducing device according to claim 2,
wherein the recording and reproduction control section resumes the recording of data after instructing the light attenuating drive section to drive the light attenuating section into a state of the retraction.

4. The data recording and reproducing device according to claim 3,
wherein upon learning that the shock detecting section has detected the shock again during a period from the detection of the shock to the resuming of the recording, the recording and reproduction control section instructs the light attenuating drive section to drive the light attenuating section into the state of the retraction again.

5. The data recording and reproducing device according to claim 1, wherein the optical recording medium is an optical disc having two or more recording layers.

6. A camera device comprising:
a shooting section;
a rotational drive section that imparts a rotational drive force to an optical disc, when recording data obtained from a signal from the shooting section onto the optical disc;
a light emitting element that generates light and emits the light toward the optical disc;
a light emission control section that feedback-controls an emitted light quantity from the light emitting element to a predetermined control target value that is set at a time of recording;
a light attenuating drive section that includes a light attenuating section, and inserts the light attenuating section into an emission path of the light from the light emitting element when performing reproduction of data from the optical disc and retracts the light attenuating section from the emission path when performing recording of data onto the optical disc; and
a shock detecting section that detects a shock of a magnitude that causes the light attenuating drive section to switch between insertion and retraction,
wherein when the shock detecting section detects the shock during the recording of data, the light emission control section lowers a control target value from a value set before shock detection.

7. A data recording and reproducing method comprising steps of:
generating light, emitting the light toward an optical recording medium, and feedback-controlling an emitted light quantity;
inserting a light attenuating section into an emission path of the light when performing reproduction of data from the optical recording medium, and retracting the light attenuating section from the emission path when performing recording of data onto the optical recording medium;
detecting a shock of a magnitude that causes a light attenuating drive section to switch between insertion and refraction; and
lowering a control target value of the emitted light quantity from a value set before shock detection, when the shock is detected during the recording of data.

* * * * *